US012561937B2

(12) United States Patent
Doukhan et al.

(10) Patent No.: US 12,561,937 B2
(45) Date of Patent: Feb. 24, 2026

(54) METHOD, COMPUTER PROGRAM, PROFILE IDENTIFICATION DEVICE

(71) Applicant: BULL SAS, Les Clayes Sous Bois (FR)

(72) Inventors: Bruce Doukhan, Teilhéde (FR); Julien De Domenico, Saint Beauzire (FR); Virgil Gouez, Mozac (FR)

(73) Assignee: BULL SAS, Les Clayes sous Bois (FR)

( * ) Notice: Subject to any disclaimer, the term of this patent is extended or adjusted under 35 U.S.C. 154(b) by 293 days.

(21) Appl. No.: 18/229,710

(22) Filed: Aug. 3, 2023

(65) Prior Publication Data

US 2024/0104886 A1 Mar. 28, 2024

(30) Foreign Application Priority Data

Aug. 17, 2022 (EP) .................................... 22306230

(51) Int. Cl.
| | |
|---|---|
| *G06V 10/46* | (2022.01) |
| *G06T 3/40* | (2006.01) |
| *G06T 5/20* | (2006.01) |
| *G06V 10/24* | (2022.01) |
| *G06V 10/25* | (2022.01) |

(52) U.S. Cl.
CPC ................ *G06V 10/46* (2022.01); *G06T 3/40* (2013.01); *G06T 5/20* (2013.01); *G06V 10/24* (2022.01); *G06V 10/25* (2022.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 9,733,717 B2 * | 8/2017 | Wajs | .................. | G06F 3/011 |
| 2020/0410705 A1 * | 12/2020 | Huang | .................. | G06T 5/50 |
| 2021/0209339 A1 * | 7/2021 | You | .................. | G06V 10/454 |

FOREIGN PATENT DOCUMENTS

| | | | | |
|---|---|---|---|---|
| EP | 3499414 A1 * | 6/2019 | ........ | G06F 16/5838 |
| FR | 3112502 A1 | 1/2022 | | |

OTHER PUBLICATIONS

European Search Report for corresponding EP Application No. 22306230, dated Jan. 16, 2023.

(Continued)

*Primary Examiner* — Vikkram Bali
(74) *Attorney, Agent, or Firm* — Goldberg & Liao, LLP

(57) ABSTRACT

The invention relates to a method (100) for identifying a profile, in particular a workpiece profile, said method (100) comprising an image acquisition phase (102) for obtaining an RGB image, an infrared, IR image, and a depth image of said profile, said method (100) further comprising a processing phase (110) comprising the following steps:

Figure 1:
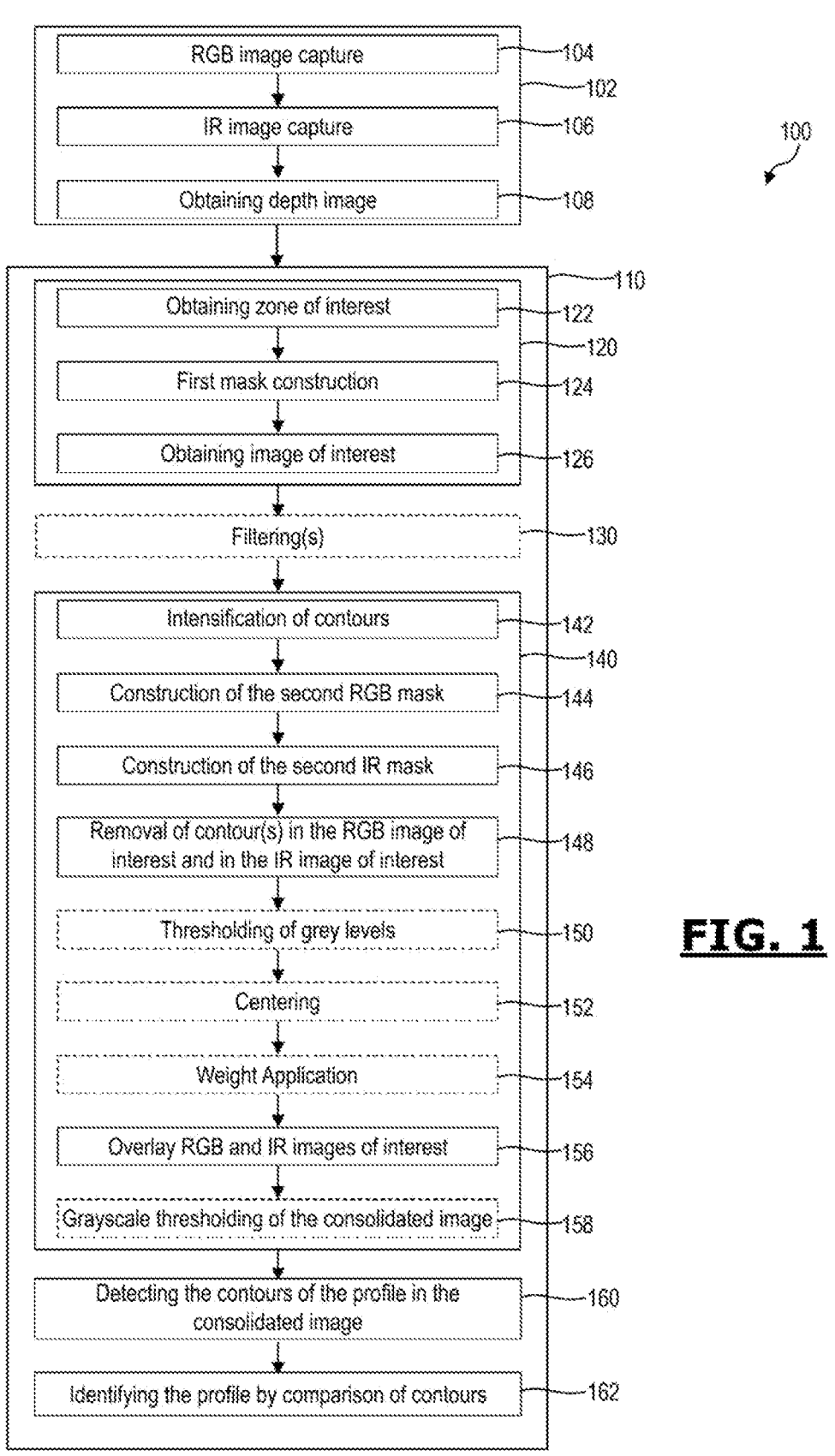

extracting (120) from said RGB image, respectively from said IR image, of a zone of interest corresponding to said profile and storing said zone of interest as RGB image of interest, respectively as IR image of interest;

constructing (140) a consolidated image from said RGB and IR images of interest;

detecting (160) the contour of said profile in said consolidated image; and identifying (162) said profile by comparing said contour to a database of profile contours.

It also relates to a device implementing such a method, and a computer program implementing the processing phase of said method.

13 Claims, 2 Drawing Sheets

(56) References Cited

OTHER PUBLICATIONS

Cao et al., "Extracting Sharp Features from RGB-D Images", Computer Graphics Forum : Journal of the European' Association' for Comput'er Graphics, Wiley-Blackwell, Oxford, vol. 36, No. 8, pp. 138-152, Oct. 24, 2016.
Loesch, "Localisatio-n d'objets 3D industriels a l'aide d'un algorithme de SLAM contraint au modele", PHD thesis, Dec. 1, 2017.

* cited by examiner

METHOD, COMPUTER PROGRAM, PROFILE IDENTIFICATION DEVICE

The present invention relates to a method for identifying profiles, and in particular workpiece profiles. It also relates to a computer program, a device implementing said method.

The field of the invention is generally the field of identification of profiles, in particular in the industrial field.

PRIOR ART

In the industrial field, there is a need for the automated identification of profiles, for example during the manufacture of objects with different profiles, but also during the working of said profiles, or during the handling of profiles.

There are different techniques that can be used for identifying profiles. A first technique consists in extracting the profile from an image. This technique is expensive because it requires the use of very high quality optics, a particular luminosity and large image processing capabilities. In addition, this technique requires very precise calibration, which complicates its use.

A second technique consists in detecting the profile by profilometry. This technique also requires calibration and has the further disadvantage of having to use fixed equipment, that is, non-mobile equipment.

A third technique proposes the use of an artificial intelligence model, such as for example a neural network, for detecting the shape of the profile and in particular the shape of the section of the profile, from an image. This technique has poor performance for reasons related to the quality and the content of the image, and also requires a significant training base. In addition, it requires new learning as soon as new profiles are detected.

One aim of the present invention is to remedy at least one of the disadvantages of the prior art solutions.

Another aim of the invention is to propose a profile identification solution, and in particular the shape of the cross-section of the profile, which is more effective, less expensive to deploy, and more flexible in use so that it can adapt to different environments but also to new profiles.

DISCLOSURE OF THE INVENTION

The invention proposes to achieve at least one of the aforementioned aims by a method for identifying a profile, in particular a workpiece profile, in particular the shape of the cross-section of the profile, said method comprising an image acquisition phase for obtaining an RGB image, an infrared (IR) image, and a depth image of said profile, said method further comprising a processing phase comprising the following steps:

- extracting from said RGB image, respectively from said IR image, a zone of interest corresponding to said profile and storing said zone of interest as RGB image of interest, respectively as IR image of interest;
- constructing a consolidated image from said RGB and IR images of interest;
- detecting the contour of said profile in said consolidated image; and
- identifying said profile by comparing said contour with a database of profile contours.

Thus, the invention proposes to recognize a profile from images of this profile, and in particular from the cross-section of this profile, without using an artificial intelligence model for the processing of images, and consequently without requiring a substantial database of training images. For these reasons, the invention is simpler, faster and less expensive to deploy than the solutions of the state of the art based on the use of a smart model. In addition, the invention makes it possible to adapt more quickly and less expensively to the new profiles to be recognized, compared to these solutions, since it does not require new training.

The invention makes it possible to recognize profiles based on images of said profile without using profilometry devices. Thus, the invention is less expensive than the solutions of the state of the art based on profilometry, requires little or no calibration, and can be installed on mobile devices.

Furthermore, the invention proposes to recognize profiles based on several images of different natures, namely at least one RGB image, an infrared image and a depth image. Thus, the invention is less sensitive to differences in luminosity, or to images of lesser quality, compared to the solutions of the state of the art based on an extraction of a profile from an image. It can be implemented with conventional optics and with greater variations in luminosity, which makes it less expensive to deploy and more accurate than these solutions.

The profile may be a profile made of metal, aluminum for example, PVC, etc.

According to embodiments, during the acquisition phase, the infrared image can be captured by an infrared camera. According to a non-limiting embodiment, the IR image can be an IR image reconstructed with two IR images taken by two IR cameras, namely a left IR camera and a right IR camera, forming a stereoscopic camera. In this case, the two infrared cameras are arranged at a known distance, referred to as baseline, from one another and the IR image is obtained from both left and right IR images respectively obtained by the left IR camera and the right IR camera.

According to embodiments, during the acquisition phase, the RGB image can be captured by an RGB camera.

According to embodiments, during the acquisition phase, the depth image can be captured by a camera.

Alternatively, the depth image can be obtained, by construction, from at least one of said IR and RGB cameras. Thus, the use of a camera dedicated to the acquisition of the depth image is avoided, which reduces the cost of the solution proposed by the present invention. In particular, the depth image can be obtained from:

- IR images obtained by a stereoscopic IR camera, as described above;
- and the RGB image obtained by the RGB camera.

The stereoscopic IR camera, or the right and left IR cameras both forming the stereoscopic IR camera, makes it possible to calculate the distance for each pixel and to apply it to the RGB image to create a depth image.

According to embodiments, the step of extracting a zone of interest in the IR image may comprise a preservation of points of said IR image located at a predetermined distance, or within a range of distances, said points forming an IR image zone.

Similarly, the step of extracting a zone of interest in the RGB image may comprise a preservation of points of said RGB image located at a predetermined distance, or within a range of distances, said points forming an RGB image zone.

The distance of each point (or pixel) from the RGB image, respectively from the IR image, can be obtained by virtue of the depth image which indicates the distance between said point (or pixel) and the position from which said image was acquired. Thus, with the depth image it is quite simple and direct to retrieve the distance from each point in the RGB image, respectively in the IR image.

The predetermined distance may be equal to the distance between the image acquisition point and the position of the profile relative to said acquisition point, optionally increased/reduced by an uncertainty value. This or these values can be determined by tests or during a quick calibration. Alternatively, this or these values can be known a priori depending on the position of the cameras used relative to the profile to be identified.

According to embodiments, the RGB image zone can be used as an RGB image of interest.

According to embodiments, the IR image zone can be used as an IR image of interest.

However, the depth image may not be sufficiently precise, for example due to reflections. Thus, when the depth image has an error, for example an error greater than or equal to 1 mm or 2 mm, then the use of the IR image zone as an IR image of interest, respectively of the RGB image zone as RGB image of interest, may not allow the profile to be directly recognized, resulting in subsequent processing operations. Indeed, the depth image makes it possible to segment and therefore identify the zone in which the profile is located. However, depending on the quality of the depth image, it is possible that said image does not allow the zone comprising the profile to be extracted, or it generates an error during this extraction.

According to alternative embodiments, the extraction step may further comprise the following steps:

constructing a first mask, referred to as first RGB mask, from the RGB image zone, constructing a first mask, referred to as first IR mask, from the IR image zone, obtaining the RGB image by convolving the RGB image with said first RGB mask, and obtaining the IR image of interest by convolution of the IR image with said first IR mask.

An IR image of interest, respectively an RGB image of interest, thus obtained, makes it possible to recognize the profile, despite errors that may exist in the depth image. In other words, in these embodiments, the invention makes it possible to be insensitive to errors that may exist in the depth image, such as for example errors due to reflections.

According to embodiments, the first RGB mask can be constructed by dilating the RGB image zone.

According to embodiments, the first IR mask can be constructed by dilating the IR image zone.

According to an optional but advantageous feature, the method according to the invention may comprise, before the step of constructing the consolidated image, a step of filtering the RGB image of interest, said consolidated image being produced from said RGB image of interest thus filtered.

Alternatively, or in addition, the method according to the invention may comprise, before the step of constructing the consolidated image, a step of filtering the IR image of interest, said consolidated image being produced from said IR image of interest thus filtered.

Such a step of filtering the RGB image of interest, respectively of the IR image of interest, may comprise the application of a bilateral filter to remove noise from said image of interest while preserving the edges, in particular the edges of the profile, in said image of interest.

Alternatively, or in addition, such a step of filtering the RGB image of interest, respectively the IR image of interest, can comprise the application of a salt and pepper filter to remove noise due to acquisition by a digital camera, if applicable.

According to embodiments, the step of constructing the consolidated image can comprise the following steps:

intensifying contours in the RGB image of interest, respectively in the IR image of interest, constructing a second mask, called second RGB mask, from the RGB image of interest, constructing a second mask, called second IR mask, from said IR image of interest, removing contours not belonging to the profile in the RGB image of interest by convolution of said RGB image of interest with said second RGB mask, removing contours not belonging to the profile in the IR image of interest by convolution of said IR image of interest with said second IR mask, and obtaining the consolidated image by adding, or overlaying, said RGB image of interest to said IR image of interest.

The use of such a second mask makes it possible to create an empty space between the contours of the profile and the close contours. This makes it possible to eliminate these contours by using this second mask on each image of interest, which allows more precise and more effective identification of the profile.

According to embodiments, the intensification of contours in the RGB image of interest may be carried out by applying a 2D filter to said RGB image of interest.

According to embodiments, the intensification of contours in the IR image of interest may be carried out by applying a 2D filter to said IR image of interest.

According to embodiments, the second RGB mask can be obtained by erosion of the RGB image of interest.

According to embodiments, the second IR mask can be obtained by erosion of the IR image of interest.

According to advantageous embodiments, the step of constructing the consolidated image can further comprise a step of recentering the IR and RGB images of interest so as to align the contours of the profile in said images of interest, in particular after the steps of removing the contours and before the step of obtaining the consolidated image.

Thus, when the profile is not at the same location on the IR and RGB images, and therefore on the IR and RGB images of interest, this recentering step makes it possible to eliminate the positional offset of the profile on said images of interest and therefore to obtain a more precise consolidated image by adding, or overlaying, said IR and RGB images of interest. Indeed, a positional offset of the profile in the images of interest will lead to an offset between the contours of said profile in the consolidated image, which will result in an inaccuracy, or even an impossibility, of identifying the profile in the consolidated image.

According to embodiments, the recentering step may comprise the following steps:

searching, in one of said IR and RGB images of interest, for a pattern present in the other of said IR and RGB images of interest, modifying the position of at least one of said images of interest in order to align said pattern in said images of interest, and optionally, resizing at least one of said images of interest so as to obtain the same size for said images of interest.

According to embodiments, the search for the pattern can be carried out by correlation of the IR and RGB images of interest.

According to embodiments, the resizing of an image of interest can be carried out by trimming said image of interest.

Advantageously, in certain embodiments, the addition of the RGB image of interest to the IR image of interest can be carried out by assigning different weights to said images of interest.

In particular, adding the RGB image of interest to the IR image of interest can be carried out by assigning a greater weight to the IR image of interest.

The use of different weights, and in particular a greater weight to the IR image of interest, makes it possible to obtain the noise in gray of the RGB image and the contours in white of the profile, in the consolidated image.

According to embodiments, the step of constructing the consolidated image can comprise a step of grayscale thresholding of the RGB image of interest obtained in the removing step, respectively from the IR image of interest obtained in the removing step, to eliminate in said image of interest the pixels whose color is black or close to black.

According to embodiments, the step of constructing the consolidated image can further comprise a step of grayscale thresholding of the consolidated image so as to retain only the white pixels in said consolidated image.

Thus, the contour detection in the consolidated image is simpler and more precise.

According to another aspect of the invention, a computer program is proposed comprising executable instructions which, when executed by a computing apparatus, implement all the steps of the processing phase of the method according to the invention.

The computer program may be in any computer language, such as for example in machine language traditionally used for scientific computing, for example in C, C++, C #, Python, etc.

According to another aspect of the invention, a device for identifying a profiled element comprising means configured to implement all the steps of the method according to the invention is proposed.

In general, the device may comprise, in terms of physical means, all the features described above with reference to the method according to the invention, and which are not repeated here for the sake of conciseness.

According to embodiments, the device according to the invention can comprise:

at least one means for acquiring an infrared image, an RGB image and a depth image, of said profile; and at least one processing unit configured to perform the processing phase of the method for identifying a profiled element according to the invention; and optionally, at least one panel or ring of light illuminating said profile.

According to embodiments, the device according to the invention may comprise an infrared camera for acquiring the IR image.

According to embodiments, the device according to the invention may comprise an RGB camera for acquiring the RGB image.

According to embodiments, the device according to the invention may comprise a camera for acquiring the depth image. Alternatively, the device according to the invention may comprise a computing unit to obtain the depth image from the IR image and the RGB image.

According to embodiments, the processing unit may comprise any electronic or computer means, such as an electronic chip, a processor, a calculator, a tablet, a computer, a server, etc.

6

DESCRIPTION OF FIGURES AND EMBODIMENTS

Figure 2:
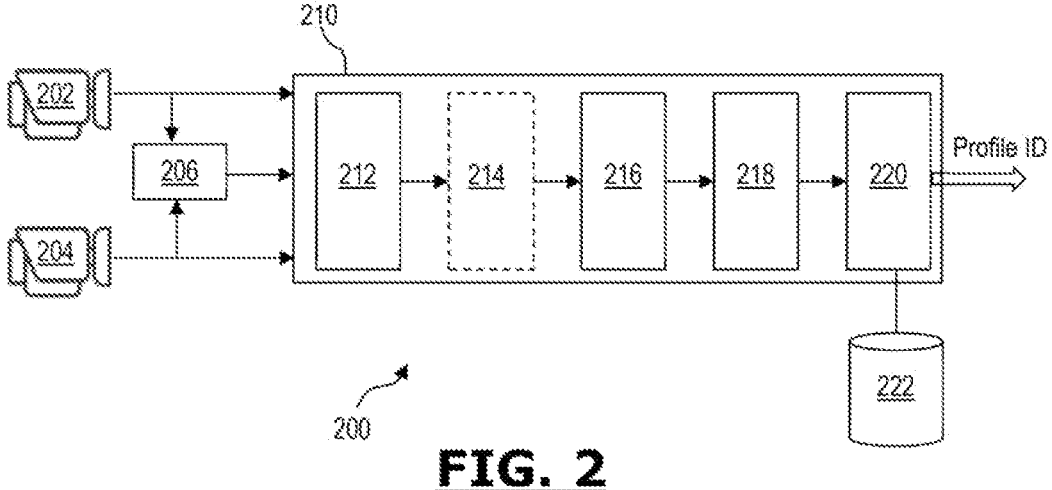

Other advantages and features will become apparent on examining the detailed description of non-limiting embodiments, and the attached drawings in which:

FIG. 1 is a schematic representation of a non-limiting exemplary embodiment of a method according to the invention; and FIG. 2 is a schematic representation of a non-limiting exemplary embodiment of a device according to the invention.

It is understood that the embodiments that will be described hereinafter are in no way limiting. It will in particular be possible to imagine variants of the invention comprising only a selection of features described below isolated from the other features described, if this selection of features is sufficient to confer a technical advantage or to differentiate the invention from the prior art. This selection comprises at least one preferably functional feature without structural details, or with only a part of the structural details if this part is only sufficient to confer a technical advantage or to differentiate the invention from the prior art.

In particular, all the variants and all the embodiments described can be combined with one another if nothing opposes this combination on the technical plane.

In the figures and in the rest of the description, the elements common to several figures retain the same reference.

FIG. 1 is a schematic representation of a non-limiting exemplary embodiment of a method according to the present invention.

The method 100 of FIG. 1 can be used for the identification of profiles, in particular in the industrial field, and in particular from the shape of the section of said profile.

The method 100 comprises a phase 102 of acquiring images of the profile.

The image acquisition phase 102 can comprise a step 104 of acquiring an RGB image of the profile by an RGB camera, and a step 106 of acquiring an infrared, IR image of the profile with an infrared camera. The acquisition phase 102 further comprises a step 108 of obtaining a depth image of the profile. This depth image can be captured by a dedicated camera.

Alternatively, the depth image can be obtained, by construction, from at least one of said IR and RGB cameras. Thus, the use of a camera dedicated to the acquisition of the depth image is avoided, which reduces the cost of the solution proposed by the present invention. In fact, the depth image can be obtained from:

IR images obtained by a stereoscopic IR camera formed by two IR cameras separated by a known distance, referred to as baseline, and the RGB image obtained by the RGB camera.

The stereoscopic IR camera, or both right and left IR cameras forming the stereoscopic IR camera, make it possible to calculate the distance for each pixel and to apply it to the RGB image to obtain a depth image.

The method 100 then comprises a processing phase 110.

The processing phase 110 comprises a step 120 whose objective is to obtain an image of interest, corresponding to the image of the profile, from the RGB image, respectively from the IR image. The image of interest obtained for the RGB image is called RGB image of interest and the image of interest obtained for the IR image is called an IR image of interest.

For the RGB image, step 120 comprises a step 122 of extracting a zone of interest, called RGB zone of interest, corresponding to the profile in said RGB image. According to one embodiment, the RGB zone of interest is obtained by keeping in said RGB image only the points/pixels whose distance is equal to a predetermined distance, or is within a predetermined range of distances. The distance of each point (or pixel) in the RGB image can be obtained by virtue of the depth image which indicates the distance between said point (or pixel) and the observation position of the scene.

The predetermined distance may be equal to the distance between the image acquisition point and the position of the profile relative to said acquisition point, optionally increased/reduced by an uncertainty value. This or these values can be known a priori depending on the position of the cameras.

During a step 124, a first RGB mask is created for the RGB zone of interest. According to one embodiment, the first RGB mask can be created by expansion of the RGB zone of interest.

During a step 126, the RGB image of interest is obtained by convolution of the RGB image acquired in step 104 and the first RGB mask obtained in step 124.

Step 120, that is, steps 122-126, is repeated for the IR image to obtain an IR image of interest.

Step 120 can be carried out successively or simultaneously for the RGB image and the IR image.

Optionally, but advantageously, the processing phase 110 may comprise, after step 120, at least one filtering step 130 performing:

at least one filtering of the RGB image of interest provided by step 120; and/or at least one filtering of the IR image of interest provided by step 120.

According to non-limiting exemplary embodiments, the filtering step 130 can carry out, for at least one, in particular each, RGB and IR images of interest:

bilateral filtering to remove noise from said image of interest, while preserving the edges, in particular the edges of the profile, in said image of interest; and/or a salt and pepper filtering to remove noise due to the acquisition by a digital camera, if applicable.

The processing phase 110 then comprises a step 140 of constructing a consolidated image from the RGB image of interest, optionally filtered, and of the IR image of interest, optionally filtered.

Step 140 comprises a step 142 or producing an intensification of contours in the RGB image of interest and in the IR image of interest, for example by applying a 2D filter.

During a step 144, a second mask, referred to as the second RGB mask, is constructed from the RGB image of interest, for example by erosion of said RGB image of interest, optionally filtered.

During a step 146, a second mask, referred to as the second IR mask, is constructed from the IR image of interest, for example by erosion of said IR image of interest, optionally filtered.

During a step 148, one or more contours not belonging to the profile in the RGB image of interest are removed by convolution of the RGB image of interest (optionally filtered in step 130) with said second RGB mask. Similarly, one or more contours not belonging to the profile in the IR image of interest are removed by convolution of the IR image of interest (optionally filtered in step 130) with said second IR mask.

During an optional step 150, a "zeroing" type of grayscale thresholding of pixels whose value is greater than a predetermined threshold value, such as for example 10, is applied to the RGB image of interest, and/or to the IR image of interest, to eliminate in said image of interest or said images of interest, the pixels whose color is black or close to black.

During an optional step 152, the RGB and IR images of interest, optionally thresholded in step 150, are realigned with one another so as to align the contours of the profile in said RGB and IR images of interest. Thus, when the profile is not at the same location in the IR and RGB images, and therefore on the IR and RGB images of interest, this recentering step 152 makes it possible to eliminate the positional offset of the profile on said images of interest.

The recentering step can be carried out in different ways. According to one exemplary embodiment, the recentering step may comprise the following operations:

searching, in one of said IR and RGB images of interest, for a pattern present in the other of said IR and RGB images of interest, for example by correlation of said IR and RGB images of interest;

modifying the position of at least one of said images of interest in order to align said pattern in said images of interest, and optionally, modifying the size of at least one of said images of interest so as to obtain the same size for said images of interest, for example by trimming said image of interest.

During an optional step 154, different weights are applied to said images of interest. In particular, a larger weight is applied to the IR image of interest compared to the RGB image of interest.

During a step 156, a consolidated image is obtained by adding, or overlaying, the RGB image of interest to said IR image of interest.

During an optional step 158, a thresholding, of the "Binary" type for the pixels greater than a predetermined threshold value, for example 200, is applied to the grayscale of the consolidated image so as to retain only the white pixels in said consolidated image.

The step 140 therefore provides a consolidated image comprising the contours of the profile. This consolidated image is not very sensitive to the variation in conditions of use, such as for example a variation in the luminosity or the presence of other profiles in the background, and does not require the use of specific and/or expensive imaging optics.

The method 100 further comprises a step 160 of detecting the contours of the profile in the consolidated image provided by step 140. This detection of contours can be carried out according to any known technique for detecting contours.

The contours detected during step 160 are compared to contours stored in a database to identify the imaged profile, during a step 162. This comparison can for example be carried out according to any known technique, for example by correlation.

Thus, the method 100 can be used to identify any type of profile, or workpiece profile, from images of said profile, and in particular from images of the section of the profile, as soon as the contour of said profile is stored in a database of profiles.

FIG. 2 is a schematic representation of a non-limiting exemplary embodiment of a device according to the present invention.

The device 200 of FIG. 2 can be used for the identification of profiles, in particular in the industrial field.

The device 200 of FIG. 2 can be used to implement a method according to the invention, and in particular the method 100 of FIG. 1.

The device 200 comprises an RGB camera 202 for acquiring an RGB image of a profile to be identified.

The device 200 further comprises an IR camera 204 for acquiring an IR image of said profile to be identified. The camera 204 may be a single IR camera. Alternatively, the camera 204 can be a stereoscopic IR camera comprising a first IR camera, called right IR camera, and a second IR camera, called left IR camera, arranged at a known distance from one another, called baseline.

The device 200 further comprises a computing module 206 for constructing a depth image from the images captured by at least one of said cameras 202 and 204. In particular, when the camera 204 is a stereoscopic IR camera, it provides two IR images: a left IR image and a right IR image. In this case, said left and right IR images can be used to calculate the distance for each pixel and to apply it to the RGB image to obtain a depth image.

The device 200 further comprises a processing unit 210. The processing unit 210 is configured to perform the processing phase of the method according to the invention, and in particular the processing phase 110 of the method 100 of FIG. 1.

The processing unit 210 comprises a module 212 for obtaining from the RGB image an RGB image of interest, and from the IR image an IR image of interest. The module 212 is in particular configured to implement step 120 of the method 100 of FIG. 1

The processing unit 210 comprises an optional module 214 for filtering the RGB image of interest, and/or for filtering the IR image of interest, provided by the module 212. The module 214 is in particular configured to implement step 130 of the method 100 of FIG. 1.

The processing unit 210 comprises a module 216 for constructing a consolidated image from the RGB image of interest and from the IR image of interest, optionally filtered. The module 216 is in particular configured to implement step 140 of the method 100 of FIG. 1.

The processing unit 210 comprises a module 218 for extracting the contour of the profile from a consolidated image, provided by the module 216. The module 218 is in particular configured to implement step 160 of the method 100 of FIG. 1.

The processing unit 210 comprises a module 220 for comparing the contour extracted from the consolidated image to contours stored in a database 222, in order to identify the profile. The module 220 is in particular configured to implement step 162 of the method 100 of FIG. 1.

The processing unit 210 can be:
a hardware unit, such as a server, a computer, a tablet, a calculator, a processor, a computer chip; or
a software unit, such as a computer program; or else
a combination of at least one software unit with at least one hardware unit.

At least one of the modules 206, 212-220 described above can be a hardware module, such as a server, a computer, a tablet, a calculator, a processor, a computer chip.

At least one of the modules 206, 212-220 described above can be a software module, such as a computer program, an application, etc.

At least one of the modules 206, 212-220 described above can be a combination of at least one software module and at least one hardware module.

At least one of the modules 206, 212-220 described above can be an individual module independent of the other modules.

At least two of the modules 206, 212-220 described above can be integrated within the same software or hardware module.

Of course, the invention is not limited to the examples that have just been described.

The invention claimed is:

1. A method for identifying a profile, in particular a workpiece profile, said method comprising an image acquisition phase for obtaining an RGB image, an infrared (IR) image, and a depth image of said profile, said method further comprising a processing phase comprising the following steps:

extracting a zone of interest corresponding to said profile, from said RGB image and said IR image, using the depth image, and storing said zone of interest as a RGB image of interest and an IR image of interest;

constructing a consolidated image from said RGB image of interest and IR image of interest, wherein said constructing comprises the following steps:

intensifying contours in the RGB image of interest and the IR image of interest, constructing a second RGB mask from the RGB area of image, constructing a second IR mask from said IR image of interest, removing contours not belonging to the profile in the RGB image of interest by convolving said RGB image of interest with said second RGB mask, removing contours not belonging to the profile in the IR image of interest by convolving said IR image of interest with said second IR mask, and obtaining the consolidated image by adding, or overlaying, said RGB image of interest to said IR image of interest;

detecting a contour of said profile in said consolidated image; and identifying said profile by comparing said contour to a database of profile contours.

2. The method according to claim 1, characterized in that, during the acquisition phase:

the IR image is captured by an infrared camera,
the RGB image is captured by an RGB camera, and
the depth image is obtained, by construction, from at least one of said infrared cameras and RGB camera.

3. The method according to claim 1, characterized in that extracting a zone of interest in the IR image and the RGB image comprises preservation of points of said IR image and RGB image located at a predetermined distance, or within a range of distances, in the depth image, points resulting from said preservation forming an IR image zone and an RGB image zone.

4. The method according to claim 3, characterized in that extracting a zone of interest in the IR image and the RGB image further comprises the following steps:

constructing a first RGB mask from the RGB image zone,
constructing a first IR mask from the IR image zone;
obtaining the RGB image of interest by convolving the RGB image with said first RGB mask, and
obtaining the IR image of interest by convolving the RGB image with said first IR mask.

5. The method according to claim 1, further comprising, before constructing the consolidated image, filtering the IR image of interest, and/or filtering the RGB image of interest, said consolidated image being produced from said IR image of interest thus filtered, and/or said IR image of interest thus filtered.

6. The method according to claim 1, wherein constructing the consolidated image further comprises recentering the IR image of interest and the RGB image of interest so as to align the contours of the profile in said images of interest.

7. The method according to claim 6, wherein recentering comprises:

searching, in one of said IR image of interest or RGB image of interest, for a pattern present in the other of said IR image of interest or RGB image of interest, modifying the position of said IR image of interest, said RGB image of interest, or both to align said pattern in said images of interest, and optionally, resizing the size of at least one of said images of interest so as to obtain the same size for said images of interest.

8. The method according to claim 1, wherein the addition of said RGB image of interest to said IR image of interest is carried out by assigning different weights to said images of interest.

9. The method according to claim 1, wherein constructing the consolidated image further comprises eliminating pixels whose color is black or close to black from said images of interest by grayscale thresholding of the RGB image of interest obtained when removing contours and of the IR image of interest obtained when removing contours.

10. The method according to claim 1, wherein constructing the consolidated image further comprises retaining only white pixels in said consolidated image by grayscale thresholding the consolidated image.

11. A device for identifying a profiled element comprising one or more means configured to implement all the steps of the method according to claim 1.

12. The device of claim 11, wherein:

the one or more means includes at least one means for acquiring an IR image, an RGB image, and a depth image of said profile; and the one or more means includes at least one processing unit configured to perform a method comprising:

extracting a zone of interest, corresponding to a profile, from an RGB image and an IR image, using depth image;

storing said zone of interest as a RGB image of interest and an IR image of interest;

constructing a consolidated image from said RGB image of interest and IR image of interest, wherein said constructing comprises:

intensifying contours in the RGB image of interest and the IR image of interest, constructing a second RGB mask from the RGB area of image, constructing a second IR mask from said IR image of interest, removing contours not belonging to the profile in the RGB image of interest by convolving said RGB image of interest with said second RGB mask, removing contours not belonging to the profile in the IR image of interest by convolving said IR image of interest with said second IR mask, and obtaining the consolidated image by adding, or overlaying, said RGB image of interest to said IR image of interest;

detecting a contour of said profile in said consolidated image; and identifying said profile by comparing said contour to a database of profile contours and optionally, the one or more means includes at least one panel or ring of light illuminating said profile.

13. A computer program stored on a non-transitory computer-readable medium of a computing apparatus, said computer program comprising executable instructions which, when executed by said computing apparatus, implement a method comprising:

extracting a zone of interest, corresponding to a profile, from an RGB image and an IR image, using depth image;

storing said zone of interest as a RGB image of interest and an IR image of interest;

constructing a consolidated image from said RGB image of interest and IR image of interest, wherein said constructing comprises:

intensifying contours in the RGB image of interest and the IR image of interest, constructing a second RGB mask from the RGB area of image, constructing a second IR mask from said IR image of interest, removing contours not belonging to the profile in the RGB image of interest by convolving said RGB image of interest with said second RGB mask, removing contours not belonging to the profile in the IR image of interest by convolving said IR image of interest with said second IR mask, and obtaining the consolidated image by adding, or overlaying, said RGB image of interest to said IR image of interest;

detecting a contour of said profile in said consolidated image; and identifying said profile by comparing said contour to a database of profile contours.

\* \* \* \* \*